United States Patent
Fu

(10) Patent No.: US 8,031,290 B2
(45) Date of Patent: Oct. 4, 2011

(54) LIQUID CRYSTAL DISPLAY WITH ACCOMMODATING FRAME HAVING REFLECTING PORTION AND LIGHT ABSORBING PORTION

(75) Inventor: Zhi-Feng Fu, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 863 days.

(21) Appl. No.: 12/072,828

(22) Filed: Feb. 28, 2008

(65) Prior Publication Data
US 2008/0204624 A1    Aug. 28, 2008

(30) Foreign Application Priority Data

Feb. 28, 2007  (CN) .......................... 2007 1 0073406

(51) Int. Cl.
*G02F 1/1333* (2006.01)

(52) U.S. Cl. ................. 349/58; 349/65; 349/67
(58) Field of Classification Search .......... None
See application file for complete search history.

(56) References Cited

U.S. PATENT DOCUMENTS

| 6,373,537 | B2 | 4/2002 | Yun et al. | |
|---|---|---|---|---|
| 6,753,843 | B2 | 6/2004 | Wang | |
| 6,880,953 | B2 | 4/2005 | Shin | |
| 7,083,318 | B2 * | 8/2006 | Ha et al. | 362/633 |
| 7,292,290 | B2 * | 11/2007 | Miyagawa et al. | 349/58 |
| 7,440,046 | B2 * | 10/2008 | Kang et al. | 349/65 |
| 2003/0128307 | A1 * | 7/2003 | Ito et al. | 349/58 |
| 2007/0200969 | A1 * | 8/2007 | Hsu et al. | 349/58 |

FOREIGN PATENT DOCUMENTS

| CN | 1427282 A | 7/2003 |
|---|---|---|
| TW | 540749 Y | 7/2003 |

* cited by examiner

*Primary Examiner* — Thanh-Nhan Nguyen
(74) *Attorney, Agent, or Firm* — Altis Law Group, Inc.

(57) ABSTRACT

An exemplary liquid crystal display includes a liquid crystal panel and a backlight module facing the liquid crystal panel. The backlight module includes a light guide plate, a light source and an accommodating frame accommodating the liquid crystal panel, the light guide plate and the light source. The accommodating frame includes a plurality of side walls. The side walls define an absorbing portion and a reflecting portion thereat. The absorbing portion is adjacent to the liquid crystal panel and is configured for absorbing light beams leaking from a periphery of the liquid crystal panel. The reflecting portion is adjacent to the light guide plate and is configured for reflecting light beams leaking from at least one peripheral portion of the light guide plate.

18 Claims, 3 Drawing Sheets

LIQUID CRYSTAL DISPLAY WITH ACCOMMODATING FRAME HAVING REFLECTING PORTION AND LIGHT ABSORBING PORTION

FIELD OF THE INVENTION

The present invention relates to a liquid crystal display (LCD) having an accommodating frame which includes a reflecting portion and a light absorbing portion.

BACKGROUND

Liquid crystal displays (LCDs) are commonly used as display devices for compact electronic apparatuses. This is not only because they provide good quality images with little power consumption, but also because they are very thin. Generally, a liquid crystal display includes a liquid crystal panel, a backlight module, and a plastic frame receiving the liquid crystal panel and the backlight module. The plastic frame is made of black material and has a high light absorption characteristic. Therefore a rate of utilization of light beams by the backlight module is limited. Various means have been developed to solve this problem.

Referring to FIG. 3 and FIG. 4, a typical liquid crystal display 30 includes a liquid crystal panel 33, a backlight module 35, and a plastic frame 37. The plastic frame 37 includes four side walls 371 perpendicularly connected end to end, and a frame-shaped ledge 373 extending from inner surfaces of the side walls 371. The side walls 371 and the ledge 373 cooperatively form an upper accommodating space and a lower accommodating space. The liquid crystal panel 33 is received in the upper accommodating space, and the backlight module 35 is received in the lower accommodating space.

The backlight module 35 includes a light guide plate 351, a light source 353, and a reflection film 355. The light guide plate 351 includes a light incident surface 3511, a top light emitting surface 3512 perpendicularly adjoining the light incident surface 3511, a bottom surface 3513 perpendicularly adjoining the light incident surface 3511, and three side surfaces 3514 perpendicularly adjoining both the light emitting surface 3512 and the bottom surface 3513. The reflection film 355 is approximately U-shaped. The reflection film 355 encloses the light incident surface 3511, the bottom surface 3513, and one of the side surfaces 3514 farthest from the light incident surface 3511. The light source 353 is located between the light incident surface 3511 and the reflection film 355.

Light beams emitted from the light source 353 enter the light guide plate 351 through the light incident surface 3511. Most of the light beams travel in the light guide plate 351 and become substantially uniform, and then emit from the light guide plate 351 through the light emitting surface 3512. Some of the light beams emit from the bottom surface 3513 and the side surfaces 3514 of the light guide plate 351. Many or most of these light beams are reflected by the reflection film 355 back into the light guide plate 351, and subsequently emit from the light emitting surface 3512. However, one drawback of the backlight module 35 is that the reflection film 355 needs to have a large enough area so as to cover all of the bottom surface 3513 and said farthest side surface 3514 of the light guide plate 351, as well as the light source 353. Therefore the cost of the reflection film 355 is high. Further, the reflection film 355 is fixed by adhesive tape, which can make the process of manufacturing the backlight module 35 complicated and difficult.

Referring to FIG. 5, another typical liquid crystal display 50 is shown. The liquid crystal display 50 has a high rate of utilization of light beams, and includes a liquid crystal panel 53, a backlight module 55, a plastic frame 57, and a frame-shaped absorbing strip 59. The plastic frame 57 includes four side walls 571 perpendicularly connected end to end, and a ledge 573 extending from inner surfaces of the side walls 571. The side walls 571 and the ledge 573 cooperatively form an upper accommodating space and a lower accommodating space. The liquid crystal panel 53 is received in the upper accommodating space, and the backlight module 55 is received in the lower accommodating space. The absorbing strip 59 is provided on a peripheral part of the liquid crystal panel 53 and a part of the plastic frame 57 surrounding the liquid crystal panel 53. The absorbing strip 59 can for example be a frame-shape piece of light blocking tape. The plastic frame 57 is made from white resin material, by an injecting-mold method. The plastic frame 57 has a high light reflection ratio.

The backlight module 55 includes a light guide plate 551, a light source 553, and a reflection film 555. The light guide plate 551 includes a light incident surface 5511, a top light emitting surface 5512 perpendicularly adjoining the light incident surface 5511, a bottom surface 5513 perpendicularly adjoining the light incident surface 5511, and three side surfaces (not labeled) perpendicularly adjoining the light emitting surface 5512 and the bottom surface 5513. The light source 553 is located adjacent to the light incident surface 5511 of the light guide plate 551. The reflection film 555 is located below the bottom surface 5513 of the light guide plate 551.

In operation of the liquid crystal display 50, light beams leaking from, the side surfaces of the light guide plate 551 reach inner surfaces of the plastic frame 57, and are reflected by the plastic frame 57. Therefore a rate of utilization of light beams of the liquid crystal display 50 is high. Furthermore, the absorbing strip 59 absorbs light beams reaching edges of the liquid crystal panel 53, thereby facilitating uniformity of light emission of the liquid crystal display 50. However, the absorbing strip 59 increases the cost of the liquid crystal display 50, and makes a process of manufacturing the liquid crystal display 50 somewhat complicated and difficult.

What is needed, therefore, is a liquid crystal display that can overcome the above-described deficiencies.

SUMMARY

In one preferred embodiment, a liquid crystal display includes a liquid crystal panel and a backlight module facing the liquid crystal panel. The backlight module includes a light guide plate, a light source and an accommodating frame accommodating the liquid crystal panel, the light guide plate and the light source. The accommodating frame includes a plurality of side walls. The side walls comprise an absorbing portion and a reflecting portion thereat. The absorbing portion is adjacent to the liquid crystal panel and is configured for absorbing light beams leaking from a periphery of the liquid crystal panel. The reflecting portion is adjacent to the light guide plate and is configured for reflecting light beams leaking from at least one peripheral portion of the light guide plate.

Other novel features and advantages will become more apparent from the following detailed description of preferred embodiments when taken in conjunction with the accompanying drawings. In the drawings, all the views are schematic.

DETAILED DESCRIPTION OF PREFERRED EMBODIMENTS

Reference will now be made to the drawings to describe preferred embodiments and exemplary embodiments of the present invention in detail.

Figure 1:
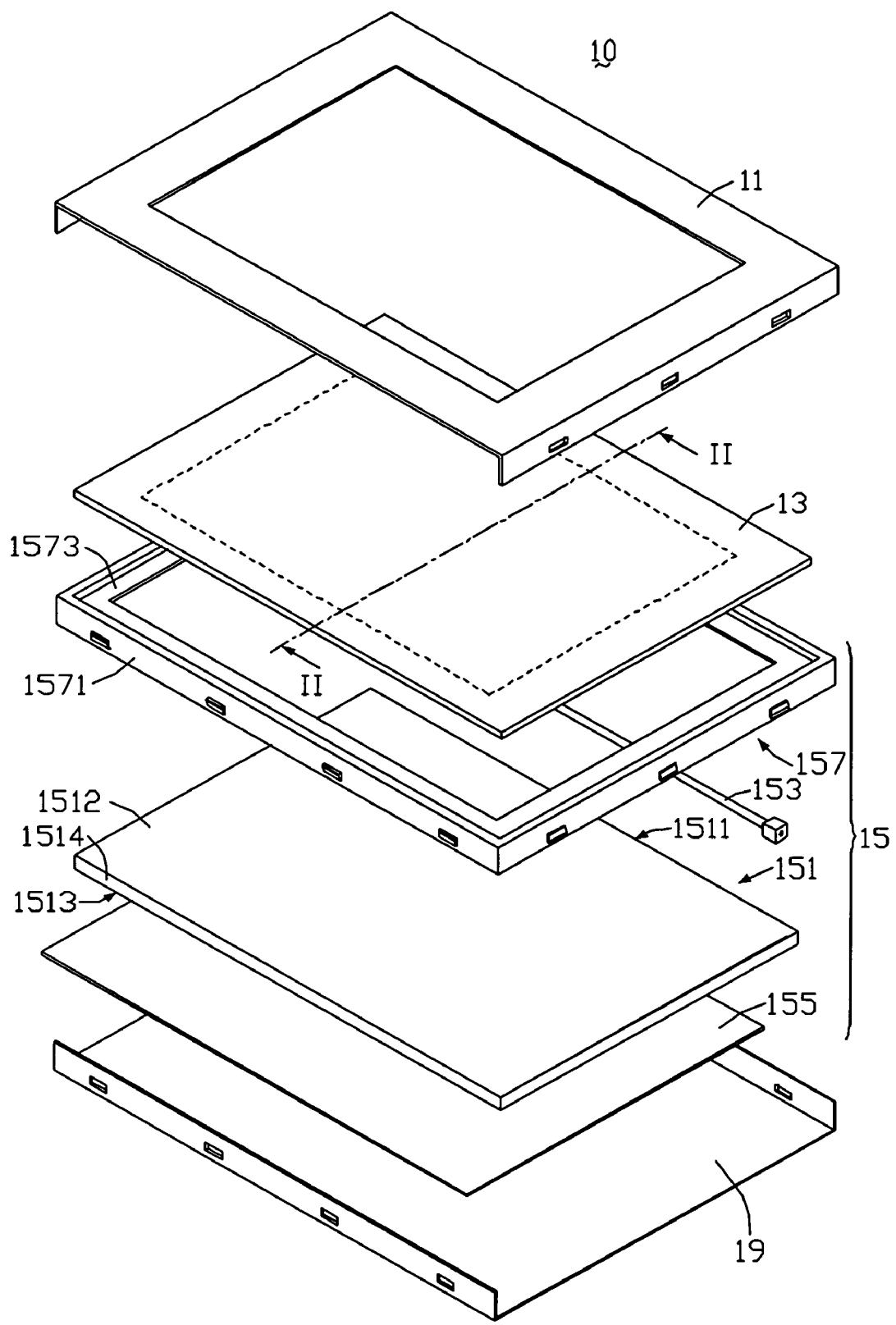
FIG. 1 is an exploded, isometric view of a liquid crystal display according to an exemplary embodiment of the present invention.

Referring to FIG. 1, a liquid crystal display 10 according to an exemplary embodiment of the present invention is shown. The liquid crystal display 10 includes an upper frame 11, a liquid crystal panel 13, a backlight module 15 adjacent to the liquid crystal panel 13, and a lower frame 19. The upper frame 11 and the lower frame 19 cooperatively form a space to accommodate the liquid crystal panel 13 and the backlight module 15.

The backlight module 15 includes a light guide plate 151, a light source 153, a reflection film 155, and an accommodating frame 157. The light guide plate 151 includes a light incident surface 1511, a top light emitting surface 1512 perpendicularly adjoining the light incident surface 1511, a bottom surface 1513 perpendicularly adjoining the light incident surface 1511, and three side surfaces 1514 perpendicularly adjoining both the light emitting surface 1512 and the bottom surface 1513. The light source 153 is located adjacent to the light incident surface 1511 of the light guide plate 151. The light source 153 can be a cold cathode fluorescent lamp (CCFL). The reflection film 155 is located below the bottom surface 1513 of the light guide plate 151.

Figure 2:
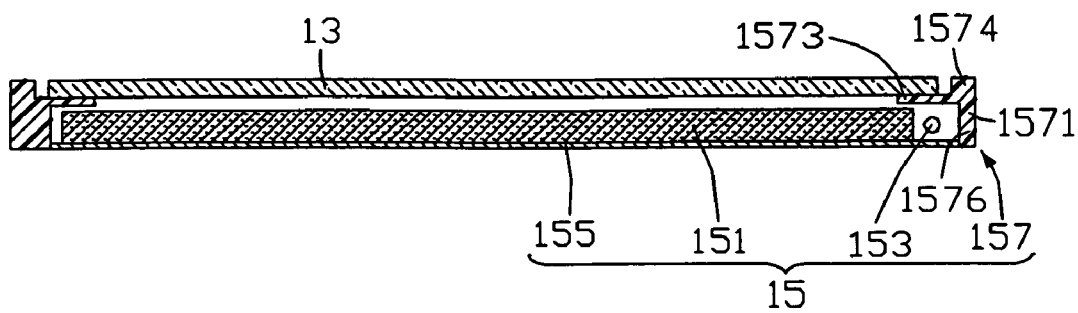
FIG. 2 is a side, cross-sectional view of the liquid crystal display of FIG. 1 once fully assembled, corresponding to line II-II thereof.
Figure 3:
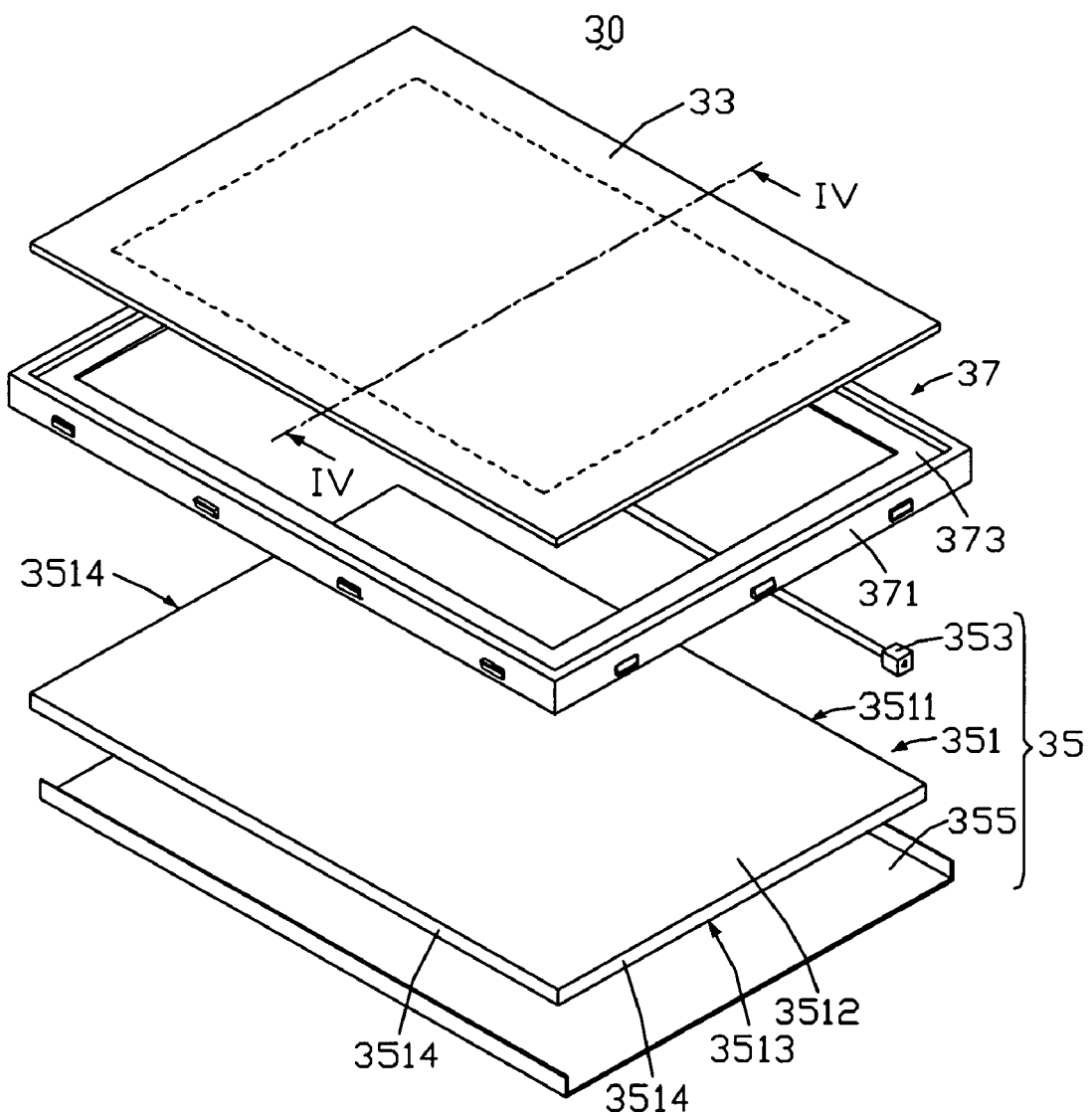
FIG. 3 is an exploded, isometric view of a conventional liquid crystal display.
Figure 4:
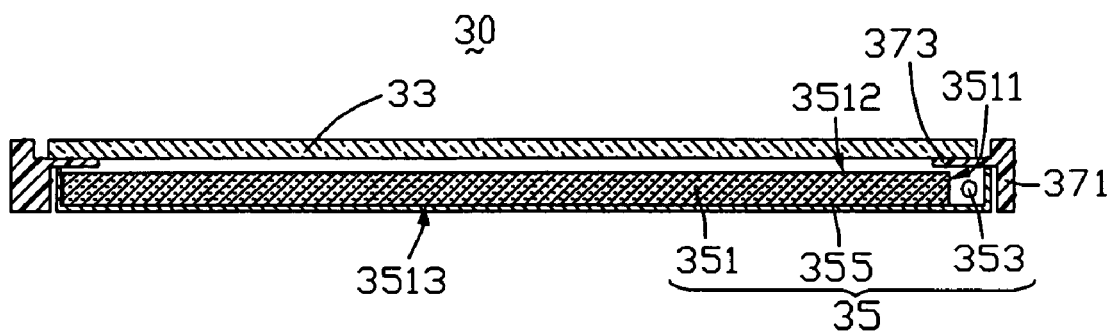
FIG. 4 is a side, cross-sectional view of the liquid crystal display of FIG. 3 once fully assembled, corresponding to line IV-IV thereof.
Figure 5:
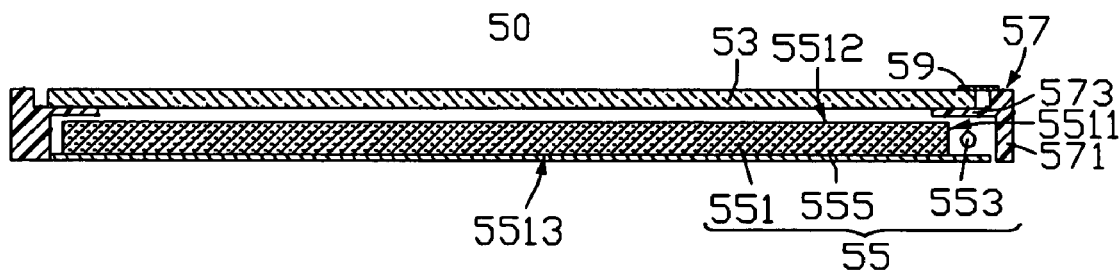
FIG. 5 is a side cross-sectional view of another conventional liquid crystal display.

Referring also to FIG. 2, the accommodating frame 157 includes four side walls 1571 perpendicularly connected end to end, and a frame-shaped ledge 1573 extending from middle portions of inner surfaces of the side walls 1571. The side walls 1571 each include an absorbing part 1574 and a reflecting part 1576. The absorbing part 1574 and the reflecting part 1576 are located at opposite top and bottom sides of the ledge 1573, respectively. The absorbing part 1574 and the ledge 1573 cooperatively form an upper accommodating space for receiving the liquid crystal panel 13. The reflecting part 1576 and the ledge 1573 cooperatively form a lower accommodating space for receiving the light guide plate 151, the reflection film 155 and the light source 153.

The accommodating frame 157 is made by a double-color injection molding method. The absorbing part 1574 of the accommodating frame 157 is made from light absorbing material such as black resin material, for absorbing incident light beams. The reflecting part 1576 of the accommodating frame 157 is made from light reflecting material such as white resin material, for reflecting incident light beams.

In a process of assembly of the liquid crystal display 10, the absorbing part 1574 of the accommodating frame 157 surrounds edges of the liquid crystal panel 13, and the reflecting part 1576 of the accommodating frame 157 surrounds the three side surfaces 1514 of the light guide plate 151 and the light source 153.

In operation of the liquid crystal display 10, the light source 153 emits light beams. The light beams enter the light guide plate 151 through the light incident surface 1511 and travel in the light guide plate 151. A majority of the light beams emit from the light emitting surface 1512 of the light guide plate 151. A minority of the light beams leak through the side surfaces 1514 and the bottom surface 1513 of the light guide plate 151. Light beams leaking through the side surfaces 1514 reach the reflecting part 1576 of the accommodating frame 157. These light beams are reflected by the reflecting part 1576 back into the light guide plate 151 for utilization. Light beams leaking through the bottom surface 1513 reach the reflection film 155. These light beams are reflected by the reflection film 155 back into the light guide plate 151 for utilization.

Furthermore, many or even most backward light beams emitting from the light source 153 are reflected by the reflecting part 1576 of the accommodating frame 157 in order to enter the light incident surface 1511 of the light guide plate 151 for utilization.

A great majority of the light beams emitting from the light emitting surface 1512 of the light guide plate 151 transmit through the liquid crystal panel 13, such that the liquid crystal display 10 can show images. A minority of the light beams emitting from the light emitting surface 1512 of the light guide plate 151 leak from peripheral edges of the liquid crystal panel 13. These light beams are absorbed by the absorbing part 1574 of the accommodating frame 157, in order to prevent any reduction in uniformity of light output from the liquid crystal panel 13.

Unlike with a conventional liquid crystal display, the liquid crystal display 10 includes the accommodating frame 157 that has the absorbing part 1574 and the reflecting part 1576. The reflecting part 1576 reflects light beams leaking through the side surfaces 1514 of the light guide plate 151, thus increasing the utilization of the light beams without the need for expanding an area of the reflection film 155. Accordingly, a cost of the liquid crystal display 10 can be reduced. In addition, the absorbing part 1574 absorbs light beams leaking from peripheral edges of the liquid crystal panel 13, such that the uniformity of light intensity output from the liquid crystal display 10 is improved. Therefore, the display quality of the liquid crystal display 10 is enhanced. Furthermore, the accommodating frame 157 is made by a double-color injection molding method. No light blocking tape is needed, and a process of manufacturing the liquid crystal display 10 is simplified.

In alternative embodiments, part or all of the ledge 1573 can be made of light reflecting material such as white resin material together with the absorbing part 1574. This configuration can enhance reflection of light beams that leak through the side surfaces 1514 back into the light guide plate 151. This configuration can also enhance reflection of backward light beams that emit from the light source 153 back into the light guide plate 151 through the light incident surface 1511. When part of the ledge 1573 is made of light reflecting material, this can for example be the lower half of the ledge 1573 that is adjacent to the light guide plate 151.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal display comprising:
a liquid crystal panel; and
a backlight module facing the liquid crystal panel, the backlight module comprising:
a light guide plate;
a light source provided adjacent to the light guide plate; and
an accommodating frame accommodating the liquid crystal panel and the backlight module, the accommodating frame comprising a plurality of side walls, the side walls comprising an absorbing portion and a reflecting portion, the absorbing portion being adjacent to the liquid crystal panel and being configured for absorbing light beams leaking from a periphery of the liquid crystal panel, the reflecting portion being adjacent to the light guide plate and surrounding the light guide plate and the light source, and being configured for reflecting light beams leaking from at least one peripheral portion of the light guide plate.

2. The liquid crystal display as claimed in claim 1, wherein the accommodating frame further comprises a ledge extending from inner surfaces of the side walls, the absorbing portion and the reflecting portion being located at opposite top and bottom sides of the ledge.

3. The liquid crystal display as claimed in claim 1, wherein the reflecting portion of the accommodating frame is made from white resin material.

4. The liquid crystal display as claimed in claim 1, wherein the absorbing portion of the accommodating frame is made from black resin material.

5. The liquid crystal display as claimed in claim 1, wherein the accommodating frame is a double-color injection molded accommodating frame.

6. The liquid crystal display as claimed in claim 1, wherein the accommodating frame further comprises a ledge extending from inner surfaces of the side walls, the absorbing portion of the side walls being located at a top side of the ledge, the reflecting portion of the side walls being located at a bottom side of the ledge, and at least a bottom portion of the ledge comprising another reflecting portion connecting with the reflecting portion of the side walls.

7. A liquid crystal display comprising:
a liquid crystal panel;
a light guide plate;
a light source provided adjacent to the light guide plate; and
an accommodating frame comprising an inner ledge, a first portion and a second portion, the first portion and the second portion being located at opposite top and bottom sides of the inner ledge, respectively, the first portion surrounding the liquid crystal panel and being made of light absorbing material, and the second portion surrounding three sides of the light guide plate and three sides of the light source and being made of light reflecting material.

8. The liquid crystal display as claimed in claim 7, wherein the second portion of the accommodating frame reflects light beams leaking from at least one peripheral portion of the light guide plate.

9. The liquid crystal display as claimed in claim 7, wherein the second portion of the accommodating frame is made from white resin material.

10. The liquid crystal display as claimed in claim 7, wherein the first portion of the accommodating frame absorbs light beams leaking from a periphery of the liquid crystal panel.

11. The liquid crystal display as claimed in claim 7, wherein the first portion of the accommodating frame is made from black resin material.

12. The liquid crystal display as claimed in claim 7, wherein the accommodating frame is a double-color injection molded accommodating frame.

13. A liquid crystal display comprising:
a liquid crystal panel;
a light guide plate;
a light source provided adjacent to the light guide plate; and
an accommodating frame accommodating the liquid crystal panel, the light guide plate and the light source, the accommodating frame comprising a side wall and a ledge extending from an inner surface of the side wall, the side wall comprising an absorbing portion and a reflecting portion, the absorbing portion and the ledge cooperatively defining a first accommodating space for receiving the liquid crystal panel, the reflecting portion and the ledge cooperatively defining a second accommodating space for receiving the light guide plate and the light source, the absorbing portion surrounding the liquid crystal panel and being configured for absorbing light beams irradiating the absorbing portion, and the reflection portion substantially surrounding a combination of the light guide plate and the light source and being configured for reflecting light beams irradiating the reflection portion.

14. The liquid crystal display as claimed in claim 13, wherein the absorbing portion of the accommodating frame is made from black resin material.

15. The liquid crystal display as claimed in claim 14, wherein the reflection portion of the accommodating frame is made from white resin material.

16. The liquid crystal display as claimed in claim 15, wherein the accommodating frame is a double-color injection molded accommodating frame.

17. The liquid crystal display as claimed in claim 13, wherein the ledge substantially covers the whole light source, and forms another reflecting portion at a surface thereof adjacent to the second accommodating space for helping transmit light beams into the light guide plate.

18. The liquid crystal display as claimed in claim 13, wherein light beams leaking from edges of the liquid crystal panel are directly absorbed by the absorbing portion of the accommodating frame.

* * * * *